Aug. 26, 1941.  W. L. ALLISON  2,253,548
DUMP TRUCK
Filed Aug. 4, 1940  3 Sheets-Sheet 1

INVENTOR
William L. Allison
BY
Pennie Davis Marvin & Edmonds
ATTORNEY

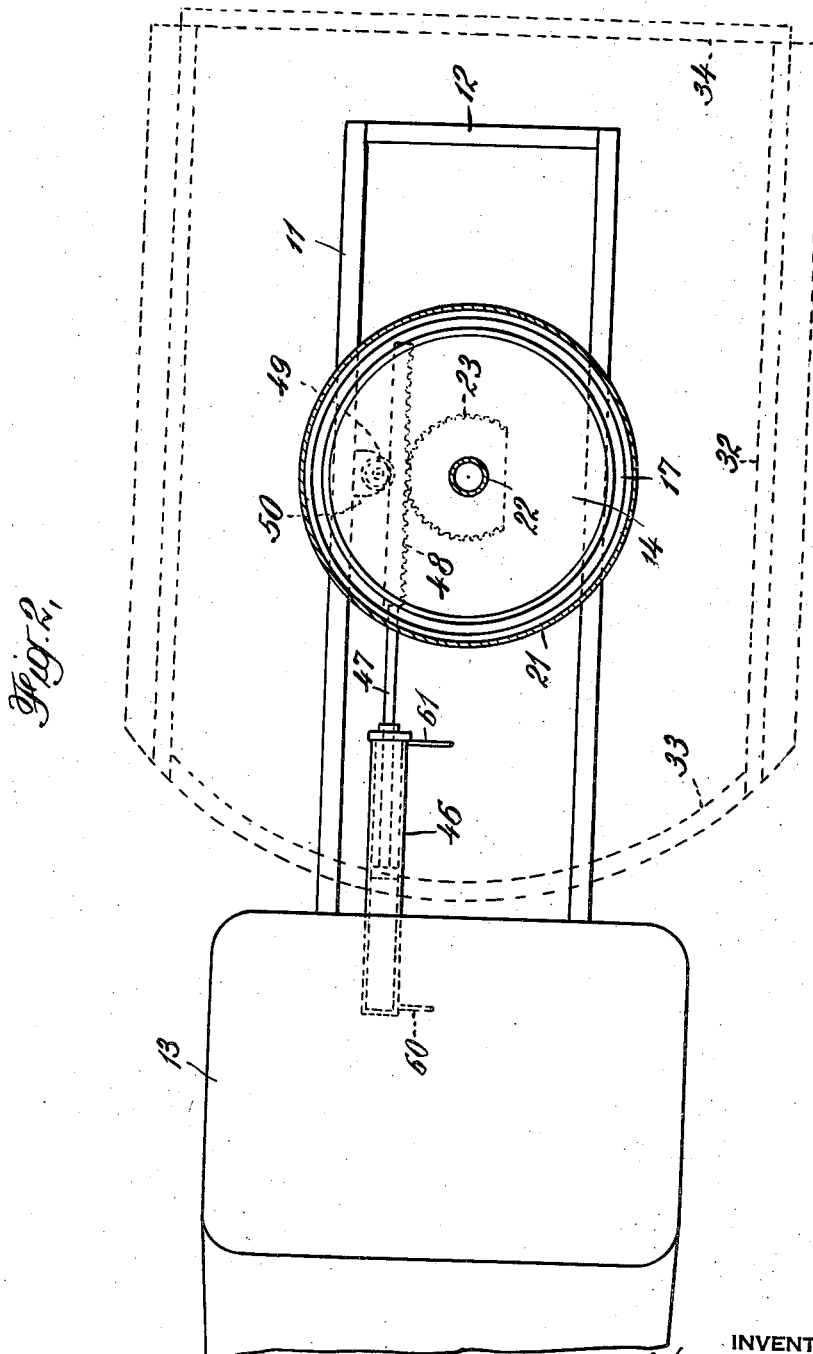

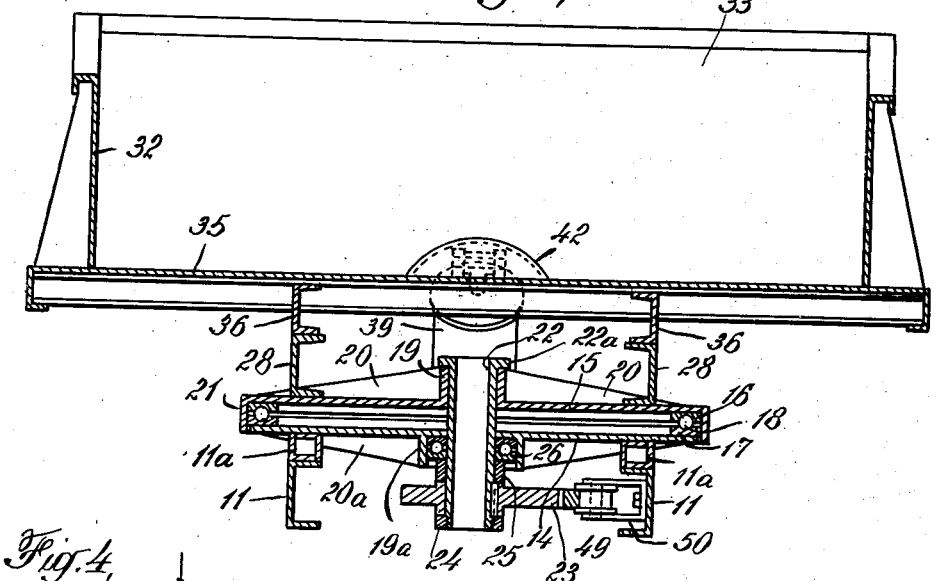
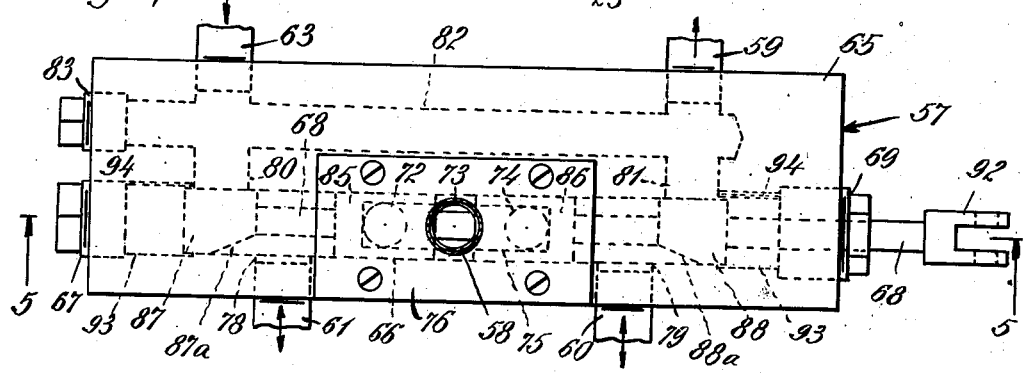
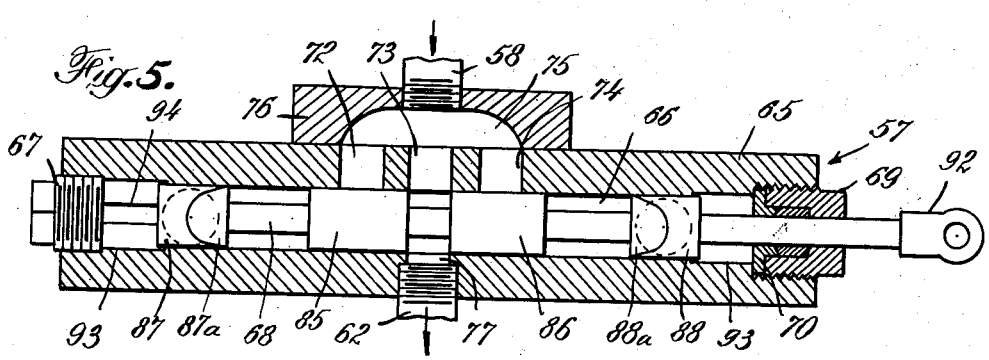

Patented Aug. 26, 1941

2,253,548

UNITED STATES PATENT OFFICE 2,253,548

DUMP TRUCK

William L. Allison, Phoenix, Ariz.

Application August 4, 1940, Serial No. 351,354

10 Claims. (Cl. 298—9)

This invention relates to dumping trucks in which the body is movable about both vertical and horizontal axes so that the load may be dumped at either side or at the rear of the vehicle. More particularly, the invention is concerned with a truck of the type referred to in which the body may be moved selectively about either of its axes by a novel hydraulic operating means including a pair of cylinders containing pistons for actuating the body, and a valve which controls the flow of a fluid between the cylinders and a pump for forcing the fluid into the cylinders. The control valve is of novel construction and its use enables the operator to dump the load accurately and easily at any point throughout a wide range.

In my Patent No. 2,174,956, issued October 3, 1939, I have disclosed a dumping truck in which the body is mounted on a turn table and is tilted about a horizontal axis by a hoist cylinder pivoted at one end on the table and containing a piston extending through the opposite end to the dump body. The piston is actuated by a fluid delivered from a pump mounted on the chassis and connected at its delivery side to the power end of the cylinder so that fluid delivered from the pump to this end of the cylinder causes the piston to tilt the body to a dumping position. At its opposite end, the hoist cylinder is connected to the return side of the pump, whereby fluid displaced in the cylinder during the hoisting operation is circulated back to the pump. When it is desired to dump the load on one side or the other, the turn table is rotated by a gear driven directly from a power take-off operated by the truck motor. While this construction provides for accurate dumping of the load, it requires two separately controlled actuating means, one for dumping the body hydraulically and the other for rotating the body on its vertical axis.

One feature of the present invention, therefore, resides in the provision of a novel dumping truck in which the body is moved selectively about either a horizontal axis or a vertical axis by hydraulic means having a single control. A truck made in accordance with the invention comprises a chassis and a body mounted thereon in any suitable manner so that it may be tilted about a horizontal axis or swung about a vertical axis. Movement of the body about its horizontal axis is effected by a hoist cylinder and piston mounted on the support for the dump body and operatively connected to the body, while movement of the body about its vertical axis is effected by a swing cylinder and piston arranged to rotate the body in either direction depending on the end of the cylinder in which fluid is delivered. The pistons are operated by fluid delivered from a pump mounted on the chassis and connected to the opposite ends of the cylinders through a valve means by which the delivery of fluid from the pump to the cylinders and back to the pump may be controlled selectively. The valve means has three different operating positions, in one of which the delivery side of the pump is connected to the power end of the hoist cylinder while the opposite end of the hoist cylinder is connected to the return side of the pump, whereby the pump operates to tilt the body to its dumping position. In the second position of the valve means, the delivery side of the pump is connected to one end of the swing cylinder while the opposite end of the swing cylinder is connected to the return side of the pump so that the body is swung in one direction on its vertical axis, and in the third position of the valve means the connections between the delivery and return sides of the pump and the opposite ends of the swing cylinder are reversed so that the body is moved in the opposite direction on its vertical axis.

In the preferred construction, the dump body is supported on a turn table mounted for rotation about a vertical axis on a hollow king pin, and the dump body is pivotally supported on the turn table so that it may be tilted thereon about a horizontal axis. Thus, the hoist cylinder may be mounted on the turn table, and the conduits for conducting fluid between the ends of the hoist cylinder and the pump may pass through the king pin to the hoist cylinder. The swing cylinder may be arranged to rotate the turn table through a rack connected to the piston in the swing cylinder and meshing with a gear connected to the king pin or to the table itself.

Another feature of the invention resides in the provision of a control valve of novel construction which may be used to advantage for controlling the flow of fluid between the pump and the two cylinders, although it may be used for other purposes as well. The valve comprises a housing having a passage therein and inlet means for admitting fluid from the delivery side of the pump to the passage. Spaced along the passage are a number of ports adapted to be connected to the opposite ends of the cylinders, respectively, the flow of fluid from the inlet means through the passage to the ports being controlled by a valve member slidable in the passage. The housing is also provided with outlet means communicating with the passage at spaced points and adapted to be connected to the return side of the pump. The valve member is preferably provided with spaced enlargements which fit closely in the passage so that when the member is in one position the enlargements close the inlet means from the ports connected to the ends of the swing cylinder but permit flow of fluid from the inlet through the passage to the port connected to the power end of the hoist cylinder. When the valve member is moved to a second position, the enlargements close the inlet means from the port connected to the hoist cylinder but permit fluid to flow from the inlet means through the passage to the port which is connected to one end of the swing cylinder, at which time fluid may also flow from the opposite end of the swing cylinder through its corresponding port into the passage and through the outlet means to the return side of the pump. When the valve member is moved to a third position, the enlargements reverse the connections between the inlet and outlet means and the ports leading to the two ends of the swing cylinder. Preferably, the outlet means is connected to the end of the hoist cylinder opposite the power end through a permanent connection independent of the valve member, so that during the hoisting operation the fluid displaced from the hoist cylinder may be returnd to the pump.

These and other features of the invention may be better understood by reference to the accompanying drawings, in which Fig. 1 is a view of one form of the new truck in side elevation with the front part of the truck broken away;

Fig. 2 is a plan view of the truck shown in Fig. 1 with parts of the body broken away to illustrate part of the turn table mounting and the hydraulic means for rotating it;

Fig. 3 is a transverse sectional view of the turn table mounting;

Fig. 4 is a plan view of the valve for controlling the flow of fluid between the pump and the cylinders; and Fig. 5 is a sectional view on the line 5—5 in Fig. 4.

Figure 1:
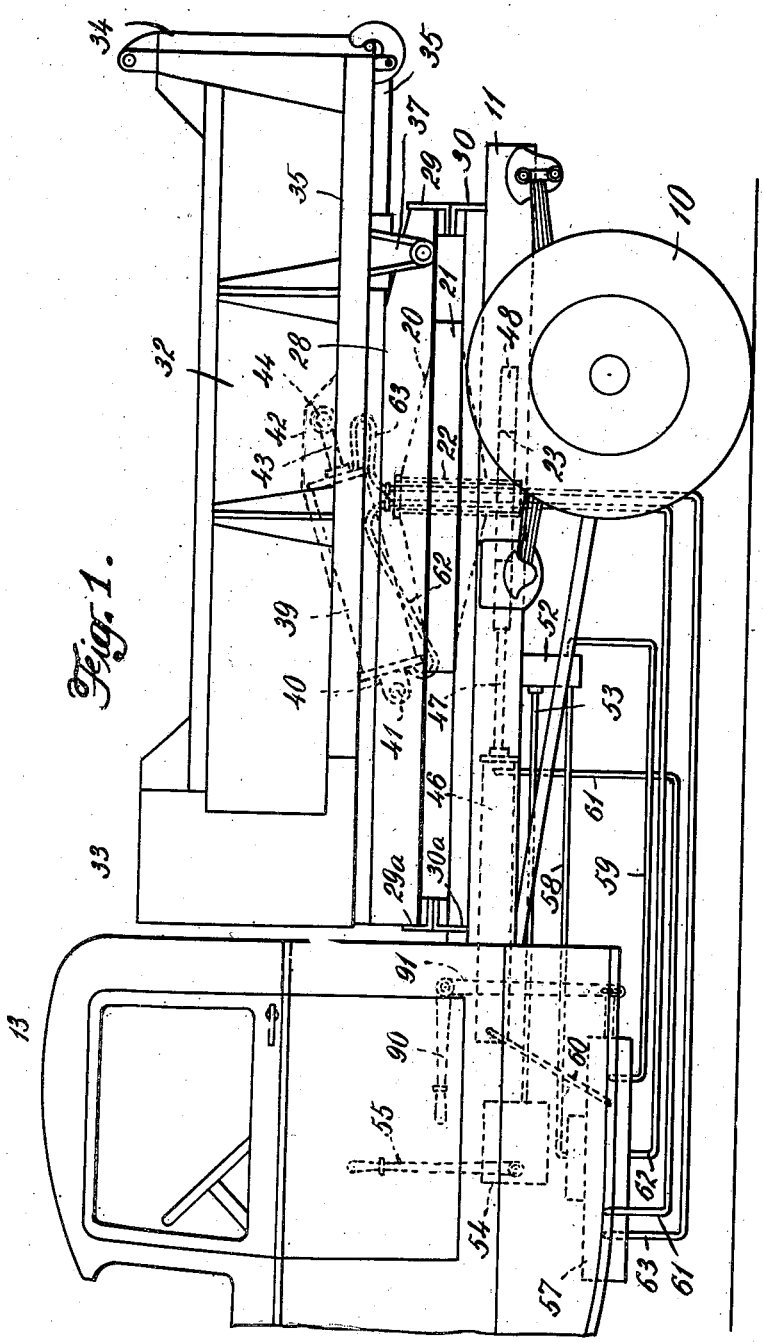

The truck, as shown in Fig. 1, comprises a chassis provided with wheels 10 and including a frame made up of longitudinal members 11 and suitable cross members, one of which is shown at 12 in Fig. 2. A cab 13 is mounted on the chassis to the rear of the truck driving motor, and behind the cab about mid-way of the length of the chassis frame is a circular platform 14 mounted on supports 11a resting on the longitudinal members 11, the platform being secured to the frame in any suitable manner. A circular plate 15 of slightly greater diameter than the platform 14 is supported on the platform by means of a circular ball bearing consisting of upper and lower race-ways 16 and 17, respectively, and a row of balls 18, the ball bearing lying near the peripheries of the platform and plate. Secured to the upper face of the plate to surround a central opening therein is a length of tubing 19 from which radiate reinforcing ribs 20, the parts being secured together in any suitable manner, as by welding. A similar tubular member 19a of greater diameter is secured to the under surface of the platform around a central opening therein, and from the member 19a radiate reinforcing ribs 20a which are secured to the member and the platform and are cut away to receive the longitudinal members 11 of the chassis frame. If desired, the periphery of the ball bearing 16, 17, 18 may be covered by an annulus 21 secured to the plate 15.

The plate and platform are held together by means of a hollow king pin 22 which extends through the tubular member 19, the plate 15, the platform 14, and the tubular member 19a. The king pin has a circumferential flange 22a at its upper end which bears against the end of the tube 19, and near its lower end it carries a gear 23 which is keyed to the pin in any suitable manner, the gear being held in position by a nut 24 threaded on the lower end of the pin. Resting on the hub of the gear is a collar 25 which supports a ball bearing 26 surrounding the king pin within the tubular member 19a, the upper race-way of the ball bearing being seated against the under surface of the platform.

Mounted on the plate 15 is a frame which comprises longitudinal channel members 28 and suitable cross members, not shown. The plate 15 and the frame carried thereby constitute a turn table which may be rotated about the axis of the king pin. Secured to the rear of the frame on the longitudinal members 28 is a bearing member 29 which slides on a supporting skid 30 on the chassis when the turn table is rotated. A similar bearing member 29a may be mounted on the front of the frame members 28 to slide on a supporting skid 30a.

A body consisting of side walls 32, a curved front end wall 33, a tail gate 34 and a bottom 35 provided with longitudinal channel members 36 is supported by the turn table; and in the normal position of the body its channel members 36 rest upon the longitudinal members 28 of the turn table. The body is pivoted to the turn table for vertical rotary movement and, for this purpose, is provided with a pair of brackets 37 attached to the members 36 and pivotally connected to the longitudinal members 28; the upper edges of the latter being cut away adjacent the brackets to permit the body to swing in a vertical plane.

The raising and lowering of the body is effected by a hoist cylinder 39 mounted on the turn table beneath the body by means of a bracket 40 through which extends a rod 41 secured to the channel members 28. The hoist cylinder extends rearwardly at an incline, with its upper end lying within a hood 42 covering an opening in the bottom of the body, and it contains a piston having a rod 43 which is attached to a pin 44 connected to the body in any suitable way.

Rotation of the turn table is effected by a swing cylinder 46 secured to the chassis and containing a piston from which a rod 47 projects through one end of the swing cylinder. Secured to the outer end of the piston rod 47 is a rack 48, the teeth of which mesh with the gear 23 on the king pin. The rack is held firmly in mesh with the gear by an idling roller 49 engaging the side of the rack opposite the gear and mounted for rotation about a vertical axis on a bracket 50 secured to one of the chassis members 11. When the turn table is in its normal position shown in Fig. 1, the gear 23 on the king pin engages the rack 48 intermediate its ends, so that when fluid is forced into the front end of the swing cylinder 46 the piston and rack are moved rearwardly and thereby rotate the gear 23 and the turn table in a clockwise direction. However, when fluid is forced into the rear end of the swing cylinder, the piston and rack are moved forwardly so as to turn the gear and turn table in the opposite direction.

The pistons in the hoist and swing cylinders are actuated by a fluid, such as oil, supplied from a pump 52 mounted on the chassis at any convenient point and driven in any suitable manner. Preferably, the pump is of the reversible type and is driven from the truck motor by means of a shaft 53 leading to a power take-off device 54 located within the cab, the device 54 being connected to the truck motor and having an operating lever 55 for reversing the drive between the motor and the pump.

The flow of fluid between the pump 52 and the ends of the hoist and swing cylinders is controlled by a valve 57 which, as shown, is mounted under the cab 13 and connected to the delivery side of the pump through a flexible line 58, the fluid being returned to the pump from the valve through another flexible line 59. The valve 57 is operable manually to control the flow of fluid through other flexible connections between the valve and the ends of the cylinders, these connections including lines 60 and 61 leading from the valve to the rear and front ends of the swing cylinder 46, respectively, and lines 62 and 63 leading from the valve through the hollow king pin to the lower or power end and the upper or return end of the hoist cylinder, respectively.

The control valve 57, as shown in Figs. 4 and 5, comprises a housing 65 having a longitudinal passage 66 extending through the housing from one end to the other, the front end of the passage being closed by a plug 67. A valve member 68 is slidable in the passage 66 and has a reduced portion extending through a collar 69 threaded in the rear end of the passage, the reduced portion also extending through a bushing 70 held in the collar. The top of the housing is provided with inlet means comprising three ports 72, 73 and 74 communicating with the central portion of the passage 66 at spaced intervals along the passage. Fluid is supplied to the inlet ports from a manifold 75 formed in a block 76 secured to the top of the housing in any suitable manner. In the top of the block 76 is an opening in which the line 58 from the delivery side of the pump is connected to conduct fluid into the manifold.

In the bottom of the housing opposite the central inlet port 73 is an outlet opening 77 which receives the line 62 leading to the lower or power end of the hoist cylinder. The side of the housing is provided with another port 78 spaced toward the front end of the housing from the inlet ports 72, 73 and 74 and communicating with the passage 66, and this port receives the line 61 connected to the front end of the swing cylinder 46. A similar port 79 in the same side of the housing communicates with the passage 66 between the inlet ports and the rear end of the housing and receives the line 60 connected to the rear end of the swing cylinder. Extending laterally from the passage 66 toward the opposite side of the housing is another port 80 which communicates with the passage between the port 78 and the adjacent front end of the housing, while a similar port 81 leads from the passage between the port 79 and the adjacent rear end of the housing. The passages 80 and 81 are connected by a longitudinal duct 82 drilled in the housing from the front end thereof, the duct being closed at the front end of the housing by a plug 83. At its outer end, the port 80 is connected to the line 63 which leads from the upper or return end of the hoist cylinder, and the outer end of the port 81 is connected to the return line 59 leading to the pump.

The valve member 68 is formed with a pair of spaced enlargements 85 and 86 which fit closely in the passage 66. These enlargements are so proportioned that when the valve member is in its intermediate position shown in Figs. 4 and 5 they cover the inlet ports 72 and 74 but permit fluid to flow from the central inlet port 73 through the passage into the outlet opening 77. As shown, the enlargements 85 and 86 project beyond the inlet port 72 and 74 toward the ends of the passage, and spaced from these enlargements toward the adjacent ends of the passage are additional enlargements 87 and 88 which, in the intermediate position of the valve member, cover the ports 80 and 81, respectively. The enlargement 87 is located between the port 78 and the adjacent front end of the housing, when the valve member is in the intermediate position, and its edge adjacent the port 78 is cut away as shown at 87a. Similarly, the enlargement 88 is located between the port 79 and the adjacent rear end of the housing, when the valve member is in its intermediate position, and has its edge adjacent the port 79 cut away as shown at 88a. The valve member may be moved from its intermediate position in either direction, and when it is moved to the left as seen in Figs. 4 and 5, the enlargement 86 completely covers the inlet port 73 and outlet opening 77 and uncovers the inlet port 74 so that fluid may flow from port 74 through the passage 66 into port 79, while the enlargement 85 remains between the inlet port 72 and the port 78 so as to prevent the flow of fluid from one to the other. At the same time, the enlargement 87 moves to the left of port 80 so that fluid may flow into this port from the port 78, while the enlargement 88 remains between ports 79 and 81 so as to prevent flow from one to the other but allows fluid to pass from inlet port 74 to the port 79 through the cut away portion 88a. When the valve member is moved to the right of its intermediate position, as seen in Figs. 4 and 5, the reverse action takes place. That is, the enlargement 85 completely covers the inlet port 73 and outlet opening 77 but opens the inlet port 72 so that fluid may pass through the passage into port 78, while the enlargement 86 occupies the passage between ports 74 and 79 so as to prevent the flow of fluid between them. At the same time, the enlargement 88 uncovers port 81 and allows fluid to flow into this port from the port 79, while the enlargement 87 occupies the passage between ports 78 and 80 so as to prevent flow of fluid between them but permits the flow of fluid from port 72 to port 78 through the cut away portion 87a. The valve member may be moved selectively to any one of the three different positions by means of an operating handle 90 in the cab secured to a lever 91 pivotally connected to the outer end of the valve member.

The operation of the truck is as follows: When it is desired to tilt the body to a dumping position, the valve member 68 is moved to its intermediate position and the pump 52 is started in operation by manipulation of the handle 55. As a result, fluid is delivered from the discharge side of the pump through the line 58, manifold 75, inlet port 73, passage 66, outlet opening 77, and line 62 to the lower or power end of the hoist cylinder, whereby the piston in this cylinder is moved rearwardly so as to elevate the front end of the body on its pivotal mounting 37. The fluid displaced by the piston in the rear end of the hoist cylinder passes through line 63 into the port 80 of the housing and then through duct 82 and port 81 to the return line 59 leading to the inlet side of the pump. When it is desired to lower the body to its normal position, the lever 55 of the take-off device is moved to the position for reversing the pump 52, whereby the fluid is circulated in the opposite direction and the piston in the hoist cylinder is returned to its initial position. It will be understood that the reversing mechanism of the take-off device 54 may, if desired, be eliminated, since the weight of the body 32 in its dumping position is sufficient to return the piston in the hoist cylinder to its initial position.

When it is desired to move the turn table mounting for the body in a clockwise direction, the valve member 68 is moved to the right from its intermediate position, as seen in Figs. 4 and 5, whereby fluid from the discharge side of the pump passes through line 58, manifold 75, inlet port 72, passage 66, port 78, and line 61 to the front end of the swing cylinder 46. Accordingly, the piston in this cylinder is moved rearwardly so as to turn the gear 23 and the turn table in a clockwise direction. The fluid displaced from the rear end of the swing cylinder by the piston during this operation passes through line 60, port 79, passage 66, port 81, and line 59 to the return side of the pump. Conversely, when it is desired to rotate the turn table in a counter-clockwise direction, the valve member 68 is moved to the left of its intermediate position, as seen in Figs. 4 and 5, whereby fluid from the discharge side of the pump passes through line 58, manifold 75, port 74, passage 66, port 79, and line 60 to the rear end of the swing cylinder. As a result, the piston therein is moved forwardly so as to rotate the gear 23 and the turn table counter-clockwise. The fluid displaced by the piston during this operation passes through line 61, port 78, passage 66, port 80, duct 82, port 81, and line 59 to the return side of the pump.

It will be apparent that the hydraulic actuating means of my invention is controlled by a single handle to move the dump body selectively in either direction about its vertical axis or upwardly about its horizontal axis. Since the lines 62 and 63 from the control valve to the hoist cylinder pass through the king pin of the turn table mounting, the movement of the dump body cannot interfere with or break these lines. The control valve 57 is of simple and compact construction and requires only one moving part. The enlargements 85, 86, 87 and 88 fit closely in the passage 66 so as to prevent leakage of fluid between the passage walls and the enlargements. If desired, the passage may be enlarged slightly near its ends, as shown at 93, and grooves 94 may be formed in the passage wall to conduct to the ports 80 and 81, respectively, any fluid which may collect in the ends of the passage. That is, if fluid should leak between the passage wall and the enlargements 87 and 88 to the ends of the passage, movement of the valve member 68 to the left, as seen in Figs. 4 and 5, will cause the enlargement 87 to displace the fluid collected in the front end of the passage and force this fluid through the groove 94 into the port 80, and when the valve member is moved to the right from its intermediate position the enlargement 88 displaces fluid collected in the rear end of the passage and forces it through the adjacent groove 93 into port 81.

I claim:

1. In a dumping truck having a chassis and a body mounted on the chassis for movement about both horizontal and vertical axes, the combination of a hoist cylinder having a piston therein for moving the body about the horizontal axis, a swing cylinder having a piston therein for moving the body about the vertical axis, a fluid pump, and means for selectively connecting the pump to one of said cylinders to operate the piston therein and thereby move the body about its corresponding axis.

2. In a dumping truck having a chassis and a body mounted on the chassis for movement about both horizontal and vertical axes, the combination of a hoist cylinder having a piston therein for moving the body about the horizontal axis, a swing cylinder having a piston therein for moving the body about the vertical axis, a fluid pump, connections between the pump and the cylinders, and a control valve in said connections for selectively controlling the distribution of fluid from the pump to the cylinders to operate one of the pistons and thereby move the body about its corresponding axis.

3. In a dumping truck having a chassis and a body mounted on the chassis for movement about both horizontal and vertical axes, the combination of a hoist cylinder having a piston therein for moving the body about the horizontal axis, a swing cylinder having a piston therein for moving the body about the vertical axis, a fluid pump, a control member for the cylinders movable to different operating positions, means operable in one position of the control member for connecting the outlet side of the pump to the hoist cylinder at one end of its piston and the inlet side of the pump to the hoist cylinder at the opposite end of its piston, and means operable in another position of the control member for connecting the outlet side of the pump to the swing cylinder at one end of its piston and the inlet side of the pump to the swing cylinder at the opposite end of its piston.

4. In a dumping truck having a chassis and a body mounted on the chassis for movement about both horizontal and vertical axes, the combination of a hoist cylinder having a piston therein for moving the body about the horizontal axis, a swing cylinder having a piston therein for moving the body about the vertical axis, a fluid pump, and means for conducting a fluid between the pump and the cylinders at opposite ends of their pistons including a control valve movable selectively to one of two operating positions and operable in one of its positions to connect the outlet side of the pump to one end of the hoist cylinder and the opposite end of the hoist cylinder to the inlet side of the pump, and in its second position to connect the outlet side of the pump to one end of the swing cylinder and the opposite end of the swing cylinder to the inlet side of the pump.

5. In a dumping truck having a chassis and a body mounted on the chassis for movement about both horizontal and vertical axes, the combination of a hoist cylinder having a piston therein for moving the body about the horizontal axis, a swing cylinder having a piston therein for moving the body about the vertical axis, a fluid pump, and means for conducting a fluid between the pump and the cylinders at opposite ends of their pistons including a control valve movable selectively to one of three operating positions and operable in one of its positions to connect the outlet side of the pump to one end of the swing cylinder and the opposite end of the swing cylinder to the inlet side of the pump, in its second position to connect the outlet end of the pump to said second end of the swing cylinder and said first end of the swing cylinder to the inlet side of the pump, and in its third position to connect the outlet side of the pump to one end of the hoist cylinder and the opposite end of the hoist cylinder to the inlet side of the pump.

6. In a dumping truck having a chassis, a turn table mounted thereon for horizontal rotary movement, and a body mounted on the turn table for vertical rotary movement, the combination of a hoist cylinder and a piston therein mounted on the turn table beneath the body for moving the body about its horizontal axis, a swing cylinder and a piston therein mounted on the chassis, a rack operated by said last piston, a gear meshing with the rack for turning the table, a pump on the chassis, and means for selectively connecting the pump to one of said cylinders to operate the piston therein and thereby move the body about its corresponding axis.

7. In a dumping truck having a chassis, a body mounted thereon for movement about horizontal and vertical axes, hoist and swing cylinders having pistons therein for moving the body about the horizontal and vertical axes, respectively, and a pump connected to the cylinders to operate the pistons, a valve for controlling the connections between the pump and the cylinders, the valve comprising a housing having a passage therein and inlet means for admitting fluid from the discharge side of the pump into the passage, ports in the housing spaced along said passage for connection to the opposite ends of the swing cylinder and the power end of the hoist cylinder, respectively, and valve means movable in the passage to connect selectively the inlet means with one of said ports.

8. In a dumping truck having a chassis, a body mounted thereon for movement about horizontal and vertical axes, hoist and swing cylinders having pistons therein for moving the body about the horizontal and vertical axes, respectively, and a pump connected to the cylinders to operate the pistons, a valve for controlling the connections between the pump and the cylinders, the valve comprising a housing having inlet and outlet means for connection to the discharge and return sides of the pump, respectively, ports in the housing for connection to the opposite ends of the cylinders, respectively, and valve means movable selectively in the housing to one position for connecting the inlet means to the port for the power end of the hoist cylinder, to a second position for connecting the inlet means to the port for one end of the swing cylinder and for connecting the port for the other end of the swing cylinder to the outlet means, and to a third position for reversing the connections of the inlet and outlet means with said last ports.

9. In a pumping truck having a chassis, a body mounted thereon for movement about horizontal and vertical axes, hoist and swing cylinders having pistons therein for moving the body about the horizontal and vertical axes, respectively, and a pump connected to the cylinders to operate the pistons, a valve for controlling the connections between the pump and the cylinders, the valve comprising a housing having inlet and outlet means for connection to the discharge and return sides of the pump, respectively, ports in the housing for connection to the opposite ends of the cylinders, respectively, valve means movable selectively in the housing to one position for connecting the inlet means to the port for the power end of the hoist cylinder, to a second position for connecting the inlet means to the port for one end of the swing cylinder and for connecting the port for the other end of the swing cylinder to the outlet means, and to a third position for reversing the connections of the inlet and outlet means with said last ports, and a permanent connection between the outlet means and the port for the return end of the hoist cylinder independent of the valve means.

10. In a dumping truck having a chassis, a turn table mounted thereon for horizontal rotary movement, and a body mounted on the turn table for vertical rotary movement, the combination of a swing cylinder and a piston therein mounted on the chassis, a rack operated by the piston, a gear meshing with the rack for turning the table, a pump on the chassis, and means for connecting the pump to the cylinder to operate the piston and thereby rotate the turn table.

WILLIAM L. ALLISON.